United States Patent
Andrade et al.

(10) Patent No.: US 9,807,589 B2
(45) Date of Patent: Oct. 31, 2017

(54) MOBILITY INDICATOR FOR UE TRANSMISSION

(71) Applicants: Dilip Andrade, Ottawa (CA); Kelvin Kar Kin Au, Ottawa (CA)

(72) Inventors: Dilip Andrade, Ottawa (CA); Kelvin Kar Kin Au, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/056,087

(22) Filed: Feb. 29, 2016

(65) Prior Publication Data

US 2017/0251356 A1    Aug. 31, 2017

(51) Int. Cl.
   *H04W 8/08*     (2009.01)
   *H04W 8/24*     (2009.01)
   *H04W 88/04*    (2009.01)

(52) U.S. Cl.
   CPC ............... *H04W 8/08* (2013.01); *H04W 8/24* (2013.01); *H04W 88/04* (2013.01)

(58) Field of Classification Search
   CPC .......... H04W 8/08; H04W 8/24; H04W 88/04
   See application file for complete search history.

(56) References Cited

U.S. PATENT DOCUMENTS

| | | | | |
|---|---|---|---|---|
| 6,505,049 B1 * | 1/2003 | Dorenbosch | .......... | H04W 88/02 340/6.1 |
| 7,383,022 B2 * | 6/2008 | Sebire | ...................... | H04L 1/20 455/441 |
| 8,095,129 B2 * | 1/2012 | Adams | .................. | H04W 48/20 370/331 |
| 8,666,434 B1 * | 3/2014 | Taylor | ..................... | G01S 19/39 455/404.2 |
| 2006/0276179 A1 * | 12/2006 | Ghaffari | .............. | H04Q 3/0033 455/412.2 |
| 2008/0160917 A1 * | 7/2008 | Dominique | .......... | H04B 17/373 455/67.11 |
| 2010/0113019 A1 | 5/2010 | Jeong et al. | | |
| 2010/0184420 A1 * | 7/2010 | Reinhold | .............. | H04W 60/04 455/418 |
| 2013/0203415 A1 * | 8/2013 | Arvidsson | ............... | H04W 8/16 455/435.1 |

(Continued)

FOREIGN PATENT DOCUMENTS

| | | |
|---|---|---|
| CN | 104823384 | 8/2015 |
| CN | 105306175 | 2/2016 |
| WO | 2014075637 | 5/2014 |

OTHER PUBLICATIONS

"Mobility State Estimation in LTE", All About 4G available at https://allabout4g.wordpress.com/2013/08/28/mobility-state-estimation-in-LTE, Aug. 28, 2013.

(Continued)

*Primary Examiner* — Nathan Mitchell

(57) ABSTRACT

Methods and systems for determining a no-mobility status for a user equipment (UE) in a wireless network. The UE may receive an indicator related to mobility of the UE, and determine, from the received indicator, that the UE has a no-mobility status. The UE may transmit an indication of its no-mobility status to the wireless network. The no-mobility status may be used by the network to select a UE to serve as a UE-to-UE relay (UUR).

20 Claims, 9 Drawing Sheets

(56) References Cited

U.S. PATENT DOCUMENTS

| | | | |
|---|---|---|---|
| 2013/0301499 A1* | 11/2013 | Jain | H04W 76/048 370/311 |
| 2014/0171053 A1* | 6/2014 | Stephens | H04W 52/0251 455/418 |
| 2014/0274044 A1* | 9/2014 | Lee | H04W 52/0254 455/434 |
| 2015/0045033 A1* | 2/2015 | Kim | H04B 7/15507 455/436 |
| 2016/0037379 A1* | 2/2016 | Shafiee | H04W 28/0268 370/230.1 |
| 2016/0187458 A1* | 6/2016 | Shah et al. | G01S 5/021 455/456.1 |
| 2016/0337842 A1* | 11/2016 | Martin | H04W 8/00 |

OTHER PUBLICATIONS

Gordon, Geoff, "Introducing Quick Charge 3.0: next-generation fast charging technology", Snapdragon Blog available at https://www.qualcomm.com/news/snapdragon/2015/09/14/introducing-quick-charge-30-next-generation-fast-aharging-technology, Sep. 14, 2015.

* cited by examiner

MOBILITY INDICATOR FOR UE TRANSMISSION

FIELD

The present disclosure relates to methods and systems for determining and indicating a no-mobility status of a user equipment (UE). Examples of the present disclosure may be implemented by a UE.

BACKGROUND

In mobile networks, such as those based on Third Generation (3G) and Fourth Generation (4G) standards, the mobility of a User Equipment (UE) is of importance to resource allocation and planning. As a UE moves with respect to the topology of the network, it is subject to handover procedures to ensure that it can remain seamlessly connected to the network as it connects to different basestations. Because the handover procedure requires network infrastructure to be involved, a network entity, such as a Mobility Management Entity (MME) tracks the mobility of a UE. UEs with high mobility are subject to a larger number of handovers as they move along a path than a UE with a normal mobility pattern. As a result, in 3G/4G networks, a UE can be assigned a High Mobility status so that the network can allocate more resources to the UEs that require them without requiring massive over provisioning of resources.

Conventionally, the mobility of a given UE is determined based on historical data relating to the UE's location. For example, a UE may be considered to have low mobility if it has not moved for a certain period of time. However, such reliance on historical data to determine the mobility status of a UE may result in a time delay in determining the mobility of a UE, particularly in situations where the UE's mobility status is quickly changing (e.g., the UE is in a stop-and-go situation such as a busy freeway).

SUMMARY

In some examples, the present disclosure describes a method by a mobile node in a wireless network. The method includes: receiving an indicator related to mobility of the mobile node; determining, from the received indicator, that the mobile node has a no-mobility status; and transmitting an indication of the mobile node's no-mobility status to the wireless network.

In some examples, the present disclosure describes a method by a network entity managing a plurality of mobile nodes in a wireless network. The method includes: receiving a no-mobility indication associated with a mobile node in the plurality; and transmitting a list of nodes having a no-mobility status, the list determined in accordance with the received indication, to a scheduler.

In some examples, the present disclosure describes a mobile device in a wireless network. The device includes a memory for storing instructions, and a processor configured to execute the stored instructions to cause the mobile device to: determine, that a received indicator is related to mobility of the mobile device; and transmit a no-mobility indication determined in accordance with the received indicator over and air interface to a network node.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
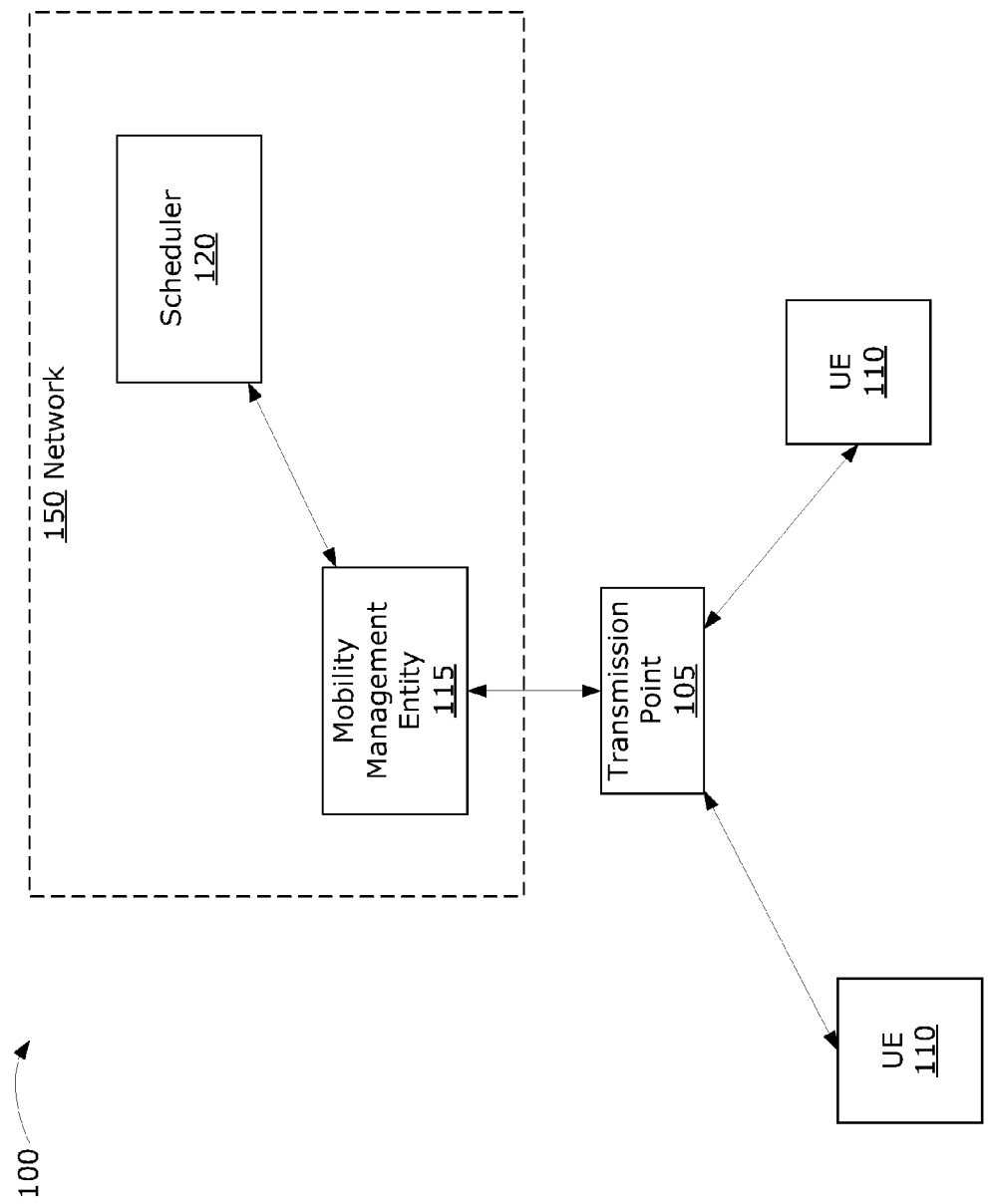
FIG. 1 is a schematic diagram of an example communications system suitable for implementing various examples described in the present disclosure.

FIG. 1 is a schematic diagram of an example communications system 100, in which examples described in the present disclosure may be implemented. The communications system 100 may include a transmission point (TP) 105, which may be a base station, such as an evolved Node B (eNB) in the Long-Term Evolution (LTE) standard, a 5G node, or any other suitable node or access point. The TP 105 may serve a plurality of mobile nodes, generally referred to as UEs 110. The TP 105 may function as an interface for communications between the UEs 110 (which may for example be located within a next generation (5G) wireless communication network) and a support network 150. The UEs 110 may receive communications from, and transmit communications to, the TP 105. Communications from the network 150 to the UEs 110 may be referred to as downlink communications, and communications from the UEs 110 to the network 150 may be referred to as uplink communications. In the simplified example shown in FIG. 1, network entities may include a mobility management entity (MME) 115 and a scheduler 120. The MME 115 may perform mobility-related operations. For example, the MME 115 may monitor the mobility status of the UEs 110, may oversee handover of a UE 110 between access points, ensure a seamless transition between access points from the perspective of a user and may enforce UE roaming restrictions, among other functions. The scheduler 120 may manage the use of network resources and/or may schedule the timing of network communications, among other functions.

Although only two UEs 110 and one TP 105 are shown, it should be understood that a given TP 105 may communicate with more or fewer UEs 110, and the network 150 may communicate with more than a single TP 105. The TP 105 may also be referred to as an eNode B, controller, base terminal station or access point, for example. The UEs 110 may include any client devices, and may also be referred to as mobile stations, mobile terminals, user devices, client devices or subscriber devices, for example.

Figure 2:
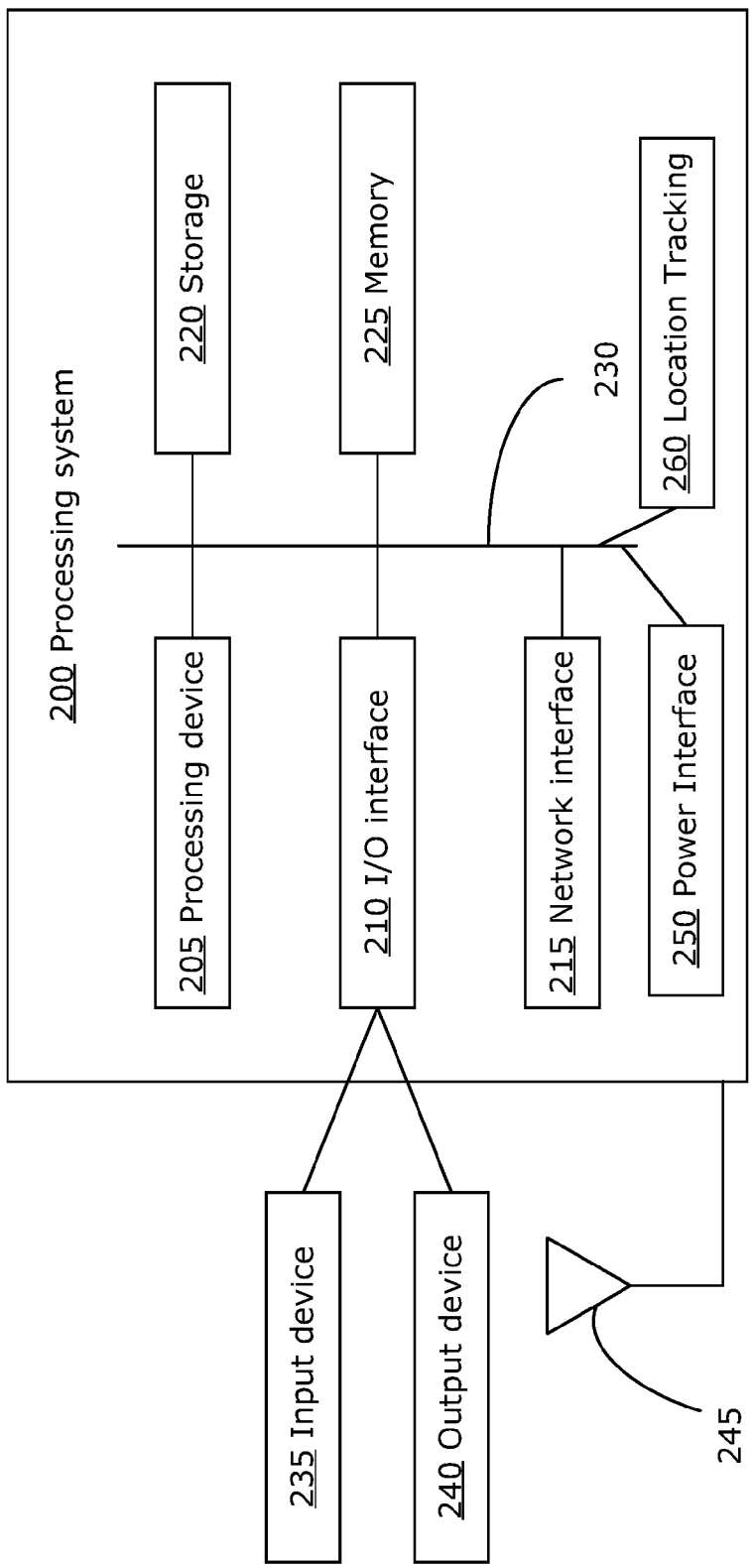
FIG. 2 is a schematic diagram of an example processing system suitable for implementing various examples described in the present disclosure.

FIG. 2 is a schematic diagram of an example simplified processing system 200, which may be used to implement the methods and systems disclosed herein, and the example methods described below. The UE 110, TP 105, MME 115 and/or Scheduler 120 may be implemented using the example processing system 200, or variations of the processing system 200. The processing system 200 may be a server or a mobile device, for example, or any suitable processing system. Other processing systems suitable for implementing examples described in the present disclosure may be used, which may include components different from those discussed below. Although FIG. 2 shows a single instance of each component, there may be multiple instances of each component in the processing system 200.

The processing system 200 may include one or more processing devices 205, such as a processor, a microprocessor, an application-specific integrated circuit (ASIC), a field-programmable gate array (FPGA), a dedicated logic circuitry, or combinations thereof. The processing system 200 may also include one or more input/output (I/O) interfaces 210, which may enable interfacing with one or more appropriate input devices 235 and/or output devices 240. The processing system 200 may include one or more network interfaces 215 for wired or wireless communication with a network (e.g., an intranet, the Internet, a P2P network, a WAN and/or a LAN) or other node. The network interfaces 215 may include wired links (e.g., Ethernet cable) and/or wireless links (e.g., one or more antennas) for intra-network and/or inter-network communications. The network interfaces 215 may provide wireless communication via one or more transmitters or transmit antennas and one or more receivers or receive antennas, for example. In this example, a single antenna 245 is shown, which may serve as both transmitter and receiver. However, in other examples there may be separate antennas for transmitting and receiving. The processing system 200 may also include one or more storage units 220, which may include a mass storage unit such as a solid state drive, a hard disk drive, a magnetic disk drive and/or an optical disk drive.

The processing system 200 may include one or more memories 225, which may include a volatile or non-volatile memory (e.g., a flash memory, a random access memory (RAM), and/or a read-only memory (ROM)). The non-transitory memories 225 may store instructions for execution by the processing devices 205, such as to carry out examples described in the present disclosure. The memories 225 may include other software instructions, such as for implementing an operating system and other applications/functions. In some examples, one or more data sets and/or modules may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 230 providing communication among components of the processing system 200. The bus 230 may be any suitable bus architecture including, for example, a memory bus, a peripheral bus or a video bus. In FIG. 2, the input devices 235 (e.g., a keyboard, a mouse, a microphone, a touchscreen, and/or a keypad) and output devices 240 (e.g., a display, a speaker and/or a printer) are shown as external to the processing system 200. In other examples, one or more of the input devices 235 and/or the output devices 240 may be included as a component of the processing system 200.

In some examples, such as where the processing system 200 is a UE 110, the processing system 200 may additionally include sensors (not shown), such as an accelerometer and/or a gyroscope, which may be used to sense movement of the UE 110. The processing system 200 may also include a location tracking subsystem 260 that includes one or more of a satellite signal based positioning system (for example GPS) subsystem and a terrestrial RF signal based locating subsystem, which may provide information about the location of the UE 110. The processing system 200 may also include a power interface 250, which may allow a battery of the UE 110 to receive power from an external power source (e.g., a charging device or a wall outlet).

In 5G networks, there may be situations in which it would be useful for a network management entity such as MME 115 to be aware of the mobility of a given UE 110. For example, the network management entity may wish to identify a UE that would be suitable to serve as a UE-to-UE Relay (UUR) in order to forward network communications to other UEs that are out of network range or in poor coverage. Typically, the UE chosen to serve as the UUR should preferably have low or no-mobility. There may be other situations in which knowing that a given UE is not mobile may be useful.

In some examples described herein, the UE 110 may determine its own mobility status and transmit a signal indicating its mobility status, including a no-mobility status, to the network. This may be useful because the UE 110 may be more quickly and/or accurately able to determine its mobility status, including whether it is currently not mobile. Although the present disclosure refers to a "no-mobility" status of a UE, such a status may apply in situations where the UE has very low mobility (e.g., moving at a very slow speed such as 1 meter per minute) or very restricted mobility (e.g., moving back-and-forth within a small area such as within a radius of 1 meter). Those skilled in the art will appreciate that a UE may participate but not be the exclusive entity in determining the mobility status. Additionally, the UE may participate (or have sole responsibility) in determining some mobility statuses and not others. In one embodiment, a UE may interact with network elements, such as an MME 115, and provide an indication of a (Low or) no-mobility state, but allow the MME 115 to make a final determination.

In some examples, the network 150 may determine that a UE has a no-mobility status, and may provide this status information to the UE. This information may be useful to the UE, for example enabling the UE to cease or decrease certain transmissions (e.g., a tracking channel signal, a heartbeat signal or location update signal) to the network, thus helping to conserve the UE's power.

In some examples, the UE may additionally provide the network with other information about its current status, such as the charging status of the UE. The charging status may provide information as to whether the UE is currently connected to a power source (e.g., the UE is connected to a charger device). Information indicating that the UE is connected to a power source may be useful to the network because such a UE is unlikely to become unavailable due to a low battery. Additionally, a UE that is connected to a fixed power source is also very unlikely to move outside small radius. Other information provided by the UE to the network may include the proximity of the UE to a TP. Information indicating that a UE is in close proximity to a TP may be useful to the network because such a UE is likely to have high quality signals to/from the network. This information may be used by the network (e.g., by the network's scheduler) to manage resources and/or manage network communications. For example, the network may determine that a UE that has a no-mobility status, is connected to a power source, and is in close proximity to a TP is more suitable to serve as a UUR.

Generally, the UE may be in one of several mobility statuses. The network may determine that the UE has a high mobility status (e.g., moving at an average speed greater than a predefined high mobility threshold) or a normal mobility status (e.g., moving at an average speed below the high mobility threshold). In examples described herein, a no-mobility status may be further defined.

Figure 3:
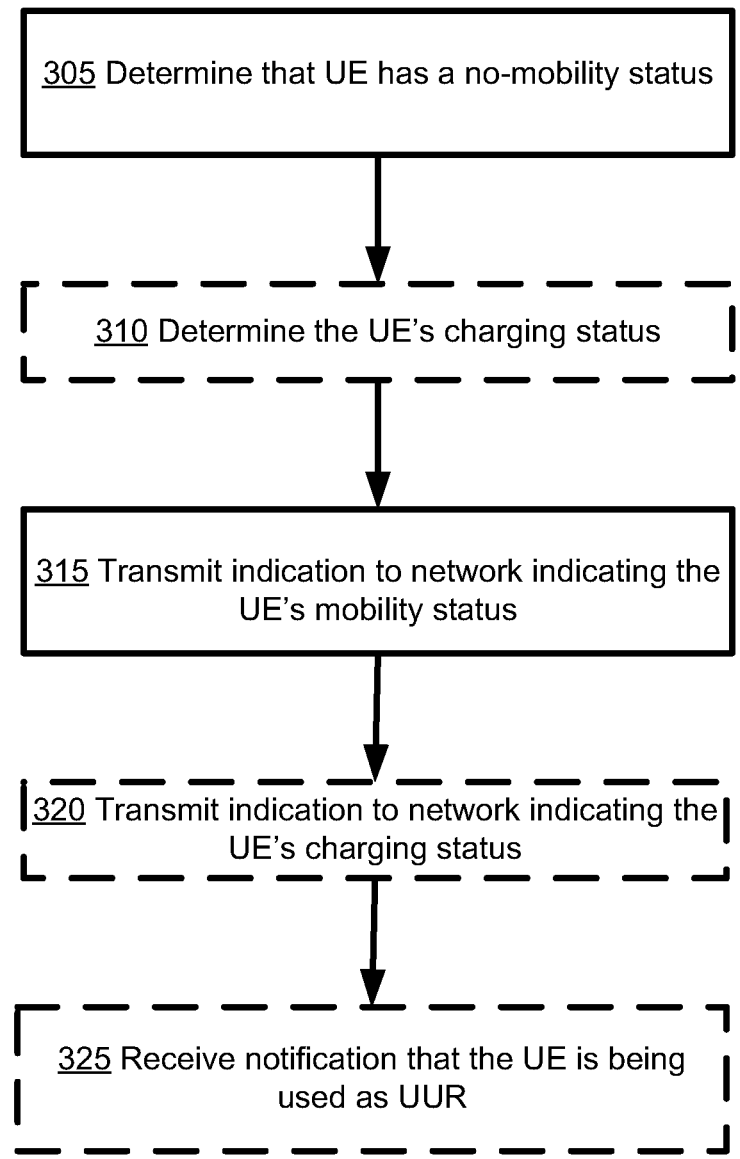
FIG. 3 is a flowchart illustrating an example method by a UE for determining and transmitting a no-mobility status.

FIG. 3 is a flowchart illustrating an example method 300 for determining a no-mobility status by a UE, and transmitting an indication of the UE's no-mobility status.

At 305, the UE makes a determination of its mobility status. The UE's mobility status may be a binary status related only to whether or not it has a no-mobility status. Alternatively, the UE's mobility status may be one of several possible statuses, for example including no-mobility, normal mobility and high mobility statuses. The UE may determine that it has a no-mobility status on the basis of information received from its own components, such as the UE's own GPS subsystem, accelerometer and/or connection with a power source.

For example, information from the UE's GPS subsystem and/or accelerometer may be received by the UE's processing device and used to categorize the UE's movements as being indicative of a no-mobility status. For example, the GPS subsystem and/or accelerometer may indicate that the UE is stationary. Alternatively, information from the GPS may indicate that the UE has an average speed or net speed below the predefined no-mobility threshold. Thus, the UE may determine that it has a no-mobility status even when the UE exhibits a very low speed (e.g., the UE moves at an average speed of less than 1 m/min) or when the UE moves but has little or no net movement over a predefined time period (e.g., the UE moves back-and-forth in a small area).

In some examples, the UE may determine that it has a no-mobility status based on information regarding a connection to a power source. For example, the UE's power interface may detect that the UE has connected to an external power source (e.g., a charging device). The UE's power interface may receive an indication from the power source to which the UE is connected that it is connected to a stationary power source. For example, a power source may provide information to the UE, via its power connection, the identity or type of the power source. The power source may provide such information in response to a query from the UE, or this information may automatically be provided as part of the normal exchange of data between the UE and the power source when the UE is connected to the power source.

The UE may determine, based on the information provided by the power source, that the power source is of a type that is a stationary power source (e.g., a desktop computer or a USB wall adaptor) and accordingly determine that the UE is also stationary. In some examples, the information provided from the power source may include information indicating whether the power source itself is in a stationary state. For example, information obtained via the battery interface may indicate that the UE is connected to a laptop computer. Because a laptop computer may be stationary as well as moving, this may not be sufficient information to determine the mobility status of the UE. Information provided by the laptop via the battery interface may further indicate that the laptop is itself plugged into a wall socket. The UE may use this further information to determine that the laptop is stationary and hence the UE is also stationary. In example embodiments, the UE is configured to detect information from the power source that indicates whether the power source is of a type that includes an AC/DC converter connected to an AC power source. A power source that includes an AC/DC converter is more likely to be a stationary power sources as opposed to a mobile power source. In some embodiments, an AC power source may provide an indication, in the form of a signal carried over a data link, that the mobile device is connected to a stationary charger. In other embodiments, the UE will detect that it is being charged, and this will serve as a cue that it may be stationary that can be further supplemented with other information.

In some examples, information from the UE's GPS subsystem and/or accelerometer may be used together with information obtained via the battery interface in order to determine the UE's mobility status. For example, where information from the power source is insufficient or ambiguous for a determination of the UE's mobility status (e.g., the power source is a legacy power source that does not provide identifying information via the power connection), the UE may use information from its GPS subsystem and/or accelerometer to determine its mobility status, similarly to that described above. By referring first to information received from the power source for determination of mobility status, and referring to GPS subsystem and/or accelerometer information only when the power source information is insufficient, the UE may be able to reduce its usage of the GPS subsystem and/or accelerometer, which may help to reduce power consumption. It should be understood that an indication that the UE is connected to a stationary power source may conflict with other information that the UE receives. For example, a UE that is connected to a power source on a moving train, may receive an indication that it is connected to a stationary power supply, but also detect using other sensors that it is not stationary. In such a scenario, a UE can, as a part of the mobility state determination, ignore the indication that it is connected to a stationary power supply.

Optionally, at 310, the UE may determine its charging status. The UE's charging status may be a binary status, for example connected to a power source or not connected to a power source. Alternatively, the UE's charging status may be one of several possible statuses, including not connected to power source, fully charged and connected to power source, or currently charging and connected to power source, for example. The charging status may be determined by the UE's processing device using information from the UE's battery interface.

At 315, the UE transmits an indication to an entity in the network (e.g., to the MME or other network entity via the TP) indicating the UE's mobility status. For example, the UE may transmit a signal including a binary flag indicating whether the UE has a no-mobility status (e.g., no-mobility flag=1) or does not have a no-mobility status (e.g., no-mobility flag=0). Alternatively, the UE may transmit a signal including a parameter value indicating the UE has one of several possible mobility statuses.

In some examples, the transmission may further include information about how the mobility status has been determined (e.g., whether using information from the GPS subsystem, accelerometer, power source, charging status or an external indicator). The transmission may also include information about whether the UE is continuing to monitor its mobility status. This further information may be used by the network to determine the reliability and/or currency of the mobility status information provided by the UE.

Optionally, at 320, where the UE has determined its charging status at 310, the UE may also transmit an indication to the network indicating the UE's charging status. For example, the UE may transmit a signal including a binary flag indicating whether the UE is connected to a power source (e.g., charging=1) or is not connected to a power source (e.g., charging=0). The indication of the UE's charging status may be sent in the same or different message as the indication of the UE's mobility status.

In some examples, where the transmission indicates the UE is connected to a power source, the transmitted information may further include information about the power source (e.g., identification of the power source type such as a source that includes an AC/DC converter).

Optionally, at 325, the UE may receive a signal from the network (e.g., via the TP) indicating that the UE is being used as a UUR. This may cause the UE to more closely monitor its mobility status, and/or to more quickly inform the network of any change in the UE's mobility status. For example, if the UE is informed that it is being used as a UUR, the UE may transmit a signal to the network indicating that the UE is no longer in a no-mobility status as soon as the mobility status changes, rather than waiting for the next scheduled transmission time. The UE may also or alternatively receive other signals from the network, including signals that indicate that the UE can cease transmitting, or reduce the frequency of transmission of, one or more of tracking channel signals, heartbeat signals or location update signals.

Figure 4:
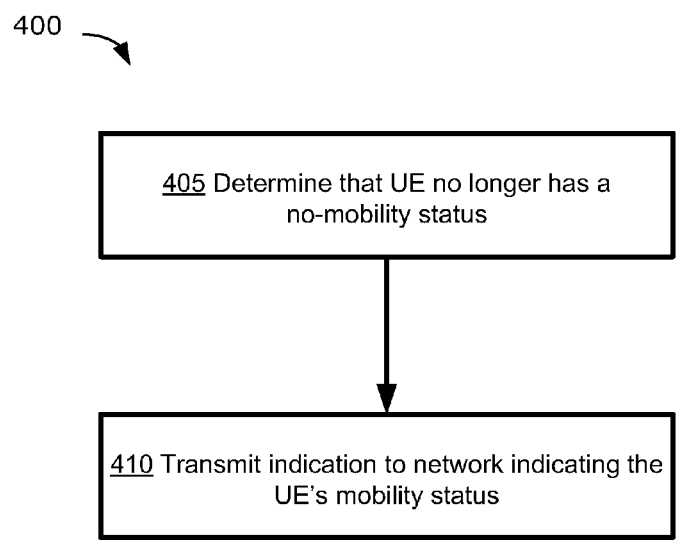
FIG. 4 is a flowchart illustrating an example method by a UE for determining and transmitting a change in the no-mobility status.

FIG. 4 is a flowchart illustrating an example method 400 for determining a change in mobility status, and transmitting indication of the change in mobility status by a UE.

At 405, the UE determines that its mobility status has changed, for example that the UE no longer has a no-mobility status. This may be based on a determination that the conditions that were the basis of its previous determination of no-mobility status are no longer valid. For example, where the UE had previously determined a no-mobility status on the basis of a connection to a stationary power source, the UE may later determine the connection is lost and hence the determination of no-mobility is possibly invalid. Additionally or alternatively, the UE may determine a change in mobility status based on information from the GPS subsystem and/or accelerometer indicating movement of the UE greater than a predetermined threshold.

In some examples, where the determination of a change in mobility status is based on a change or loss of connection to a power source, the UE may further use information from its GPS subsystem and/or accelerator to verify its mobility status. For example, loss of a connection to a power source may trigger the UE to start or increase monitoring of its GPS subsystem and/or accelerometer. The UE may determine that it maintains its no-mobility status until motion (e.g., as detected by the GPS subsystem and/or accelerometer) exceeds a predetermined threshold. By starting or increasing monitoring of the GPS subsystem and/or accelerometer only when a loss of connection to a power source is detected, the UE may be able to reduce its usage of the GPS subsystem and/or accelerometer, which may help to reduce power consumption.

In some examples, the determination of a UE's mobility status may have a hysteresis characteristic. For example, a UE that was previously mobile may be determined to have a no-mobility status when its average speed drops below a first threshold; and a UE that previously had a no-mobility status may be determined to no longer have the no-mobility status when its average speed rises above a second threshold that is higher than the first threshold. The use of different thresholds for transitioning to and from the no-mobility status may be useful to help reduce the possibility of too-rapid changes in mobility status due to transient events.

At 410, the UE transmits a signal to the network (e.g., to the MME or other network entity via the TP) indicating the change in the UE's mobility status. In some examples, the transmission may further include information about how the change in mobility status has been determined (e.g., whether a connection to a power source is lost). This further information may be used by the network to determine whether the UE is still suitable to serve as a UUR, for example.

Figure 5:
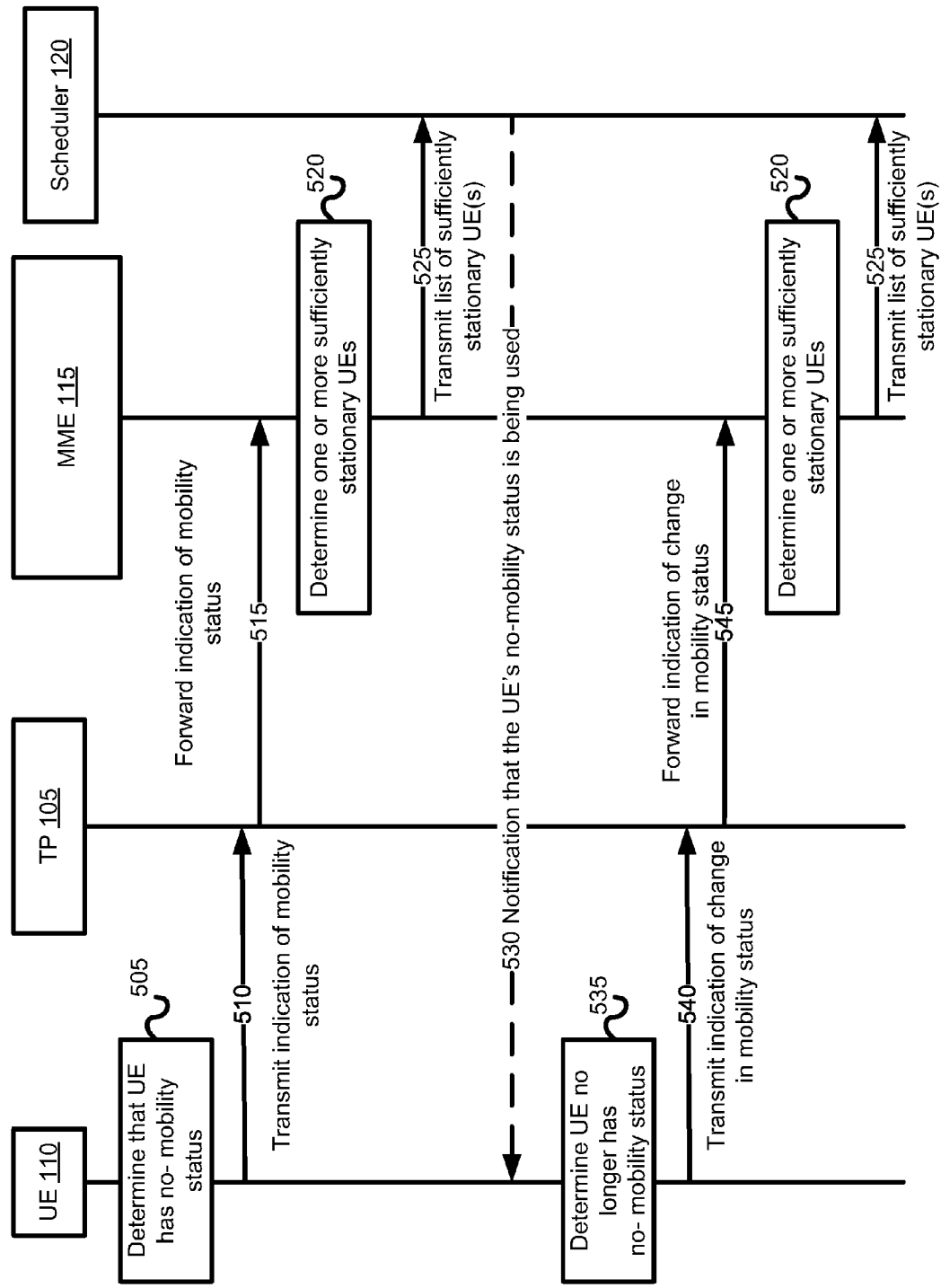
FIG. 5 is a signaling diagram illustrating example communications related to determining of a no-mobility status by a UE.

FIG. 5 is a signaling diagram illustrating an example set of communications for implementing example methods 300 and 400 described herein. In the example shown, communications may be carried out among the UE 110, the TP 105, the MME 115 and the scheduler 120 of the network. Although the MME 115 and scheduler 120 are shown as the network entities participating in this example set of communications, other network entities may instead be used. For example, the MME 115 may be replaced by another anchor point, a user-specific gateway or a virtual user-specific gateway.

At 505, the UE 110 determines that it has a no-mobility status. This may be carried out, for example, as described at 305 above with reference to FIG. 3.

At 510, the UE 110 transmits a signal to the TP 105 indicating that the UE 110 has a no-mobility status. Optionally, information about the UE's charging status may be included with this transmission (e.g., where the UE has determined its charging status, for example as described at 310 above with reference to FIG. 3). In some examples, information about the UE's charging status may be transmitted in a separate signal. In some examples, the signal from the UE 110 may also include information about the basis for its determination of no-mobility status and/or may include information about the extent of the UE's no-mobility status (e.g., whether the UE 110 is actually stationary or whether the UE 110 is moving slowly enough to be considered to have a no-mobility status). The signal may be transmitted as part of the UE's typical regular transmission to the TP 105 (e.g., as part of regular transmissions about the UE's location). Where there are multiple UEs 110 associated with the TP 105, the TP 105 may receive respective transmissions from each UE 110.

At 515, the TP 105 forwards the received signal to the MME 115. In some examples, the TP 105 may aggregate information received from all UEs 110 associated with the TP 105 and transmit an aggregated report to the MME 115 indicating the mobility statuses of all associated UEs 110. Alternatively, the report could be a list of all UEs with associated mobility information; or it could be a list of the sub-set of UEs that have no-mobility status; or it could be a list of the sub-set of UEs that are unsuitably mobile. The transmission from the TP 105 to the MME 115 may include additional information (e.g., charging status) provided by the UE 110 to the TP 105. Where there are multiple TPs 105 associated with the MME 115, the MME 115 may receive respective transmissions from each TP 105.

At 520, the MME 115 uses information received from the TP 105 to identify one or more sufficiently stationary UEs 110. This may be carried out by the MME 115 filtering the UE information down to only those UEs 110 having a no-mobility status. Alternatively, the MME 115 may sort the UEs 110 according to respective mobility statuses (e.g., no-mobility being most preferred, then low or normal mobility being ranked second and high mobility being least preferred). Where the MME 115 is additionally provided with information about the charging statuses of the UEs 110, the MME 115 may further filter or sort the UEs 110 according to their respective charging statuses. For example, a UE 110 that has a no-mobility status and is connected to a power source may be determined to be more preferred than a UE 110 with a no-mobility status that is not connected to a power source.

At 525, the MME 115 forwards to the scheduler 120 a list identifying one or more UEs 110 that are determined to be sufficiently stationary (and optionally was determined to be connected to a power source). A UE 110 that is determined to be sufficiently stationary may be a UE 110 whose mobility status matches a certain criterion, for example the mobility status is no-mobility. The scheduler 120 may use this information to identify one or more UEs 110 suitable to serve as a UUR, for example. For example, the scheduler 120 may select a UE 110 that has a no-mobility status and additionally is connected to a power source to serve as a UUR.

At 530, the scheduler 120 transmits a signal to notify the selected UE 110 that its no-mobility status is being used. For example, this signal may notify the selected UE 110 that it is to serve as a UUR. The network may take advantage of the no-mobility status of the UE 110 to signal the UE to stop transmitting, or reduce the frequency of transmission of, one or more of tracking channel signals, heartbeat signals or location update signals. Although FIG. 5 illustrates this signal being transmitted directly from the scheduler 120 to the UE 110, in some examples this signal may be forwarded to the UE 110 via the MME 115 and/or the TP 105, as appropriate. A UE 110 that receives this notification may determine that it is appropriate to more actively monitor its mobility and to more quickly notify the network of any change in its mobility status.

At 535, the UE 110 determines that it no longer has a no-mobility status, for example as described at 405 above with reference to FIG. 4. At 540, the UE 110 transmits an indication of its change in mobility status to the TP 105, similarly to 510 above. It should be noted that 535 and 540 may be performed by the UE 110 even where the UE 110 has not been notified that its no-mobility status is being used by the network (i.e., even where the UE 110 does not receive the transmission at 530). At 545, the TP 105 forwards this information to the MME 115, similarly to 515 above.

The MME 115 then updates its determination of sufficiently stationary UEs, similarly to 520 described above, and may transmit the list of sufficiently stationary UEs to the scheduler 120. The scheduler 120 makes a new determination of a UE 110 suitable to serve as a UUR. If appropriate, the scheduler 120 may transmit a signal to notify the previous UUR that it is no longer serving as a UUR.

In some examples, the determination that a UE has a no-mobility status may be performed by the network (e.g., by a network entity such as the MME). For example, the network may be able to track the UE's mobility using tracking channel signals, wireless triangulation or other suitable wireless locating techniques. The network may take advantage of a UE's determined no-mobility status to choose a suitable UE to serve as a UUR, for example as described above. Further, the network may transmit information to the UE to inform the UE that the UE has a no-mobility status (e.g., where the UE does not make this determination itself). This information may be used by the UE to initiate power-saving techniques. For example, a UE that is aware of its own no-mobility status may reduce or stop its tracking channel signals, location update signals or heartbeat signals to the network, and may also reduce or stop other processes related to location discovery and updating.

Figure 6:
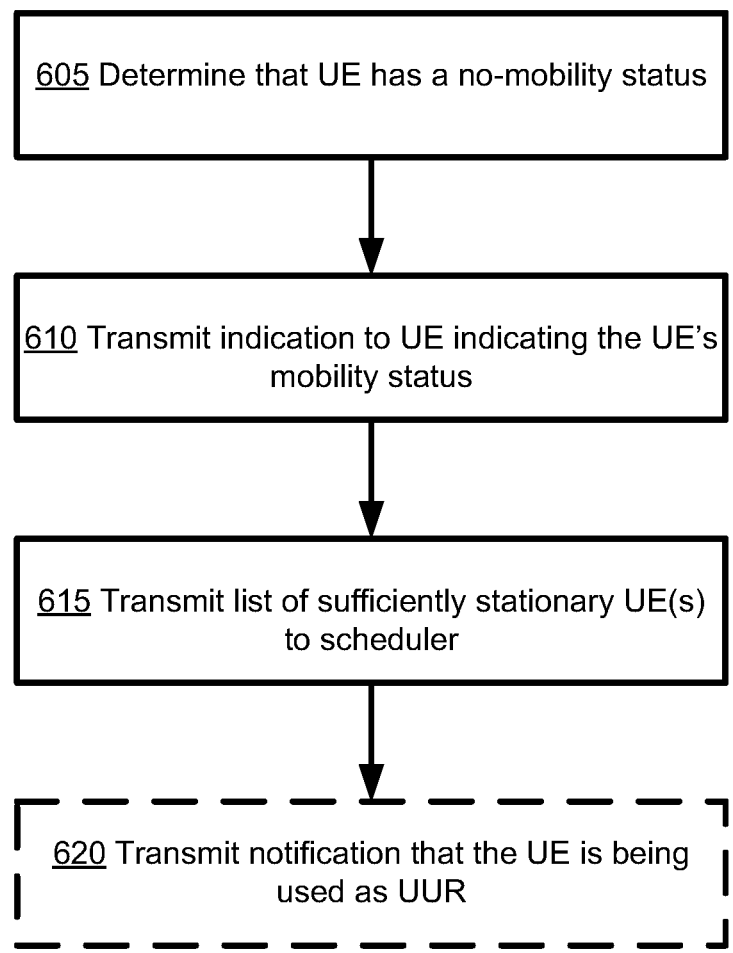
FIG. 6 is a flowchart illustrating an example method by a network entity for determining and transmitting a no-mobility status of a UE.

FIG. 6 is a flowchart illustrating an example method 600 that may be carried out by a network entity (e.g., the MME) for determining a no-mobility status of a UE and transmitting an indication of the no-mobility status to the UE.

At 605, the network entity determines that the UE has a no-mobility status. This determination may be based on tracking channel signals, wireless triangulation or other wireless locating techniques, for example. As discussed above, a UE may be considered to have a no-mobility status even where the UE in fact exhibits some motion.

At 610, the network entity transmits to the UE an indication of the UE's mobility status. Additionally or alternatively, the network entity may transmit information to the UE to allow the UE to reduce or stop its tracking channel update, location update or heartbeat transmissions to the network. The UE may or may not take advantage of its no-mobility status to reduce its power consumption.

In some examples, the UE may also provide to the network other status information, such as the UE's charging status (e.g., which may be determined by the UE as discussed above). The UE may be triggered to provide such information upon receipt of the transmission from the network entity informing the UE of its no-mobility status, for example.

At 615, the network entity (e.g., the MME) transmits a list of one or more UEs deemed to be sufficiently stationary to a further network entity (e.g., the scheduler). The list of UEs considered to be sufficiently stationary may be based on a filtering or ranking of all UEs monitored by the network entity, for example based on the UEs' mobility statuses (and optionally other status information, such as charging status where available) as described at 520 and 525 above with respect to FIG. 5.

Optionally, at 620, if a particular UE has been selected by the scheduler to serve as a UUR, the network entity may transmit a notification to the selected UE that it is being used as a UUR. The network entity may more closely monitor the mobility of the selected UE, as compared to other UEs that were not selected to serve as a UUR.

The network may further monitor the UE to determine whether the UE no longer has a no-mobility status. This may enable the network to determine whether a UE is no longer suitable to serve as a UUR, for example. Information about the change in mobility status may be transmitted to the UE, which may cause the UE to resume its location update or heartbeat transmission to the network, for example.

Figure 7:
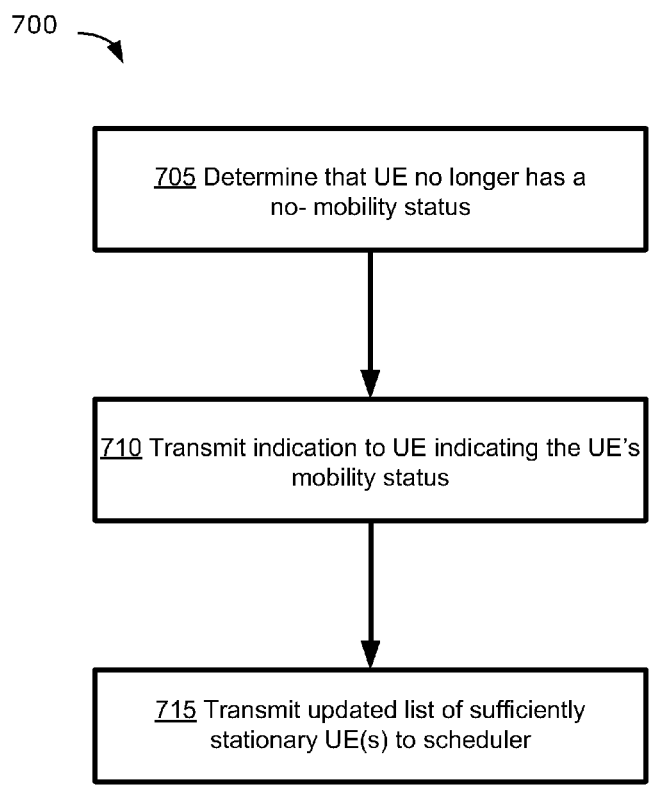
FIG. 7 is a flowchart illustrating an example method by a network entity for determining and transmitting a change in the mobility status of the UE.

FIG. 7 is a flowchart illustrating an example method 700 that may be carried out by a network entity (e.g., the MME) for determining a change in the UE's mobility status and informing the UE accordingly.

At 705, the network entity determines that the UE no longer has a no-mobility status. This may be determined using wireless locating techniques, such as wireless triangulation, similar to that used at 605 described above with reference to FIG. 6.

At 710, the network entity transmits to the UE an indication of the UE's mobility status. Additionally or alternatively, the network entity may transmit information to the UE to cause the UE to resume location update or heartbeat transmissions to the network.

At 715, the network entity transmits an updated list of one or more sufficiently stationary UEs to the scheduler, similarly to 615 described above with reference to FIG. 6.

Figure 8:
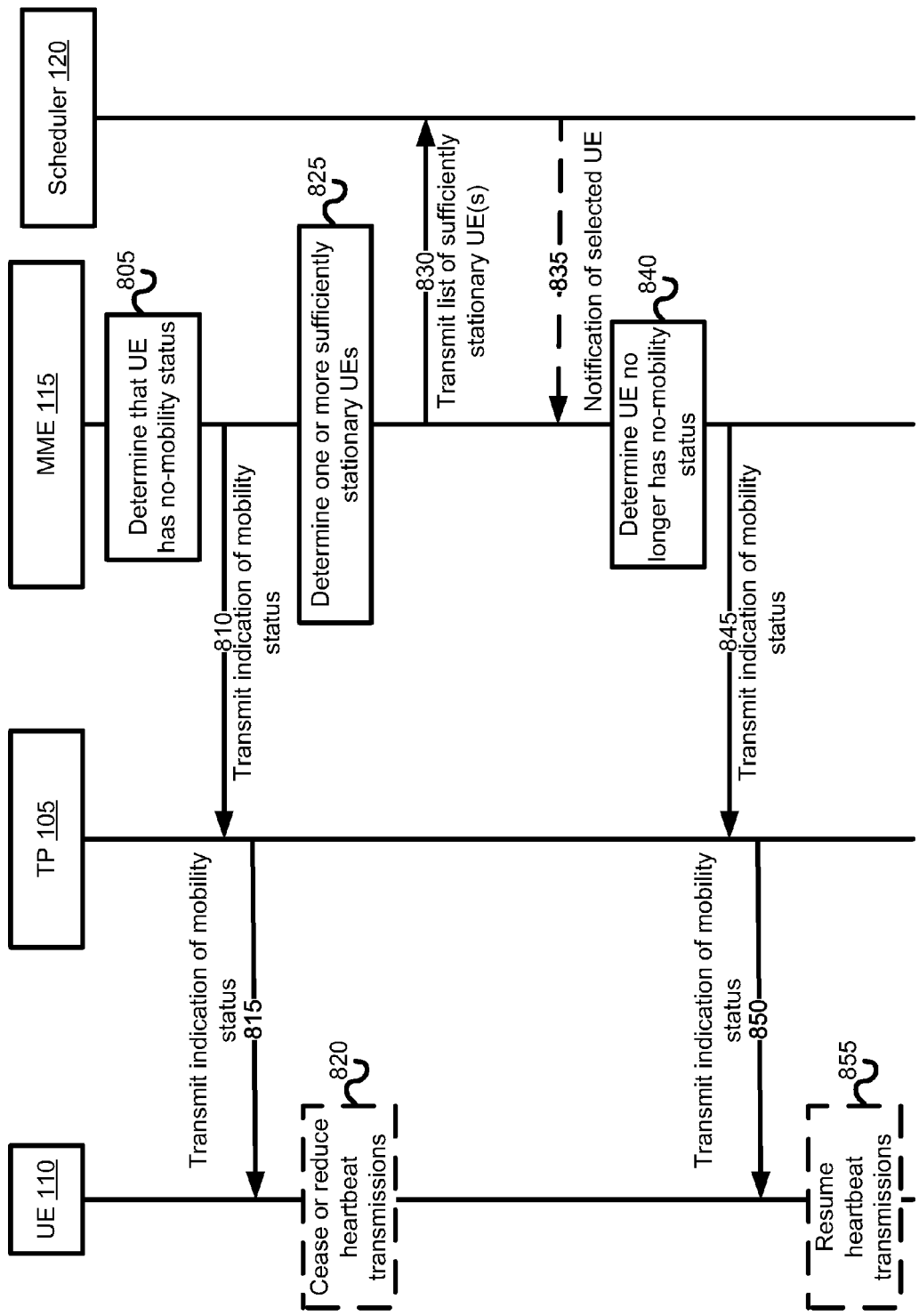
FIG. 8 is a signaling diagram illustrating example communications related to determining of a no-mobility status by a network entity.

FIG. 8 is a signaling diagram illustrating an example set of communications for implementing example methods 600 and 700 described herein. In the example shown, communications may be carried out among the UE 110, the TP 105, the MME 115 and the scheduler 120 of the network. Although the MME 115 and scheduler 120 are shown as the network entities participating in this example set of communications, other network entities may instead be used. For example, the MME 115 may be replaced by another anchor point, a user-specific gateway or a virtual user-specific gateway.

At 805, the MME 115 determines that a given UE 110 has a no-mobility status. This may be carried out, for example, as described at 605 above with reference to FIG. 6.

At 810, the MME 115 transmits a signal to the TP 105 indicating that the UE 110 has a no-mobility status. Optionally, the signal may include information enabling the UE 110 to reduce or cease its tracking channel, heartbeat or location update transmissions to the network. Where there are multiple UEs 110 associated with the TP 105 that have been identified as having a no-mobility status, the transmission to the TP 105 may be an aggregate report of all UEs 110 associated with the TP 105 that have the no-mobility status.

At 815, the TP 105 forwards the received signal to the UE 110. Where there are multiple UEs 110 identified as having the no-mobility status, the TP 105 may send separate signals to each identified UE 110. The transmission from the TP 105 to the UE 110 may include information enabling the UE 110 to reduce or cease its tracking channel, heartbeat or location update transmissions to the network.

At 820, the UE 110 uses the received information to cease or reduce its tracking channel, heartbeat or location update transmissions to the network. The UE 110 may also initiate other power-saving actions enabled by its no-mobility status.

At 825, the MME 115 uses information received from the TP 105 to identify one or more sufficiently stationary UEs 110. At 830, the MME 115 forwards to the scheduler 120 a list identifying one or more UEs 110 that are determined to be sufficiently stationary. 825 and 830 may be performed by the MME 115 anytime after determination of the no-mobility status of the UE 110 (i.e., anytime after 805). 825 and 830 may be performed similarly to 520 and 525 described above with respect to FIG. 5, for example.

At 835, the scheduler 120 transmits a signal to the MME 115 to notify the MME 115 of the selected UE 110 to serve as a UUR. The MME 115 may more actively monitor the mobility status of the selected UE 110.

At 840, the MME 115 determines that the UE 110 no longer has a no-mobility status, for example as described at 705 above with reference to FIG. 7. The MME 115 may update its list of sufficiently stationary UEs and transmit (not shown) the updated list to the scheduler 120, similarly to 830 described above.

At 845, the MME 115 transmits an indication of the change in mobility status to the TP 105, similarly to 810 above. At 850, the TP 105 may forward this information to the UE 110, similarly to 815 above.

At 855, the UE 110 may then resume its tracking channel, heartbeat or location update transmissions to the network. The UE 110 may also stop other power-saving techniques that were enabled by its previous no-mobility status.

In the examples discussed above, an example use of the UE's no-mobility status is for selection of the UE to serve as a UUR. The network may take advantage of the UE's no-mobility status in other ways, for example to optimize paging or to help with the downlink data notification mechanism.

Figure 9:
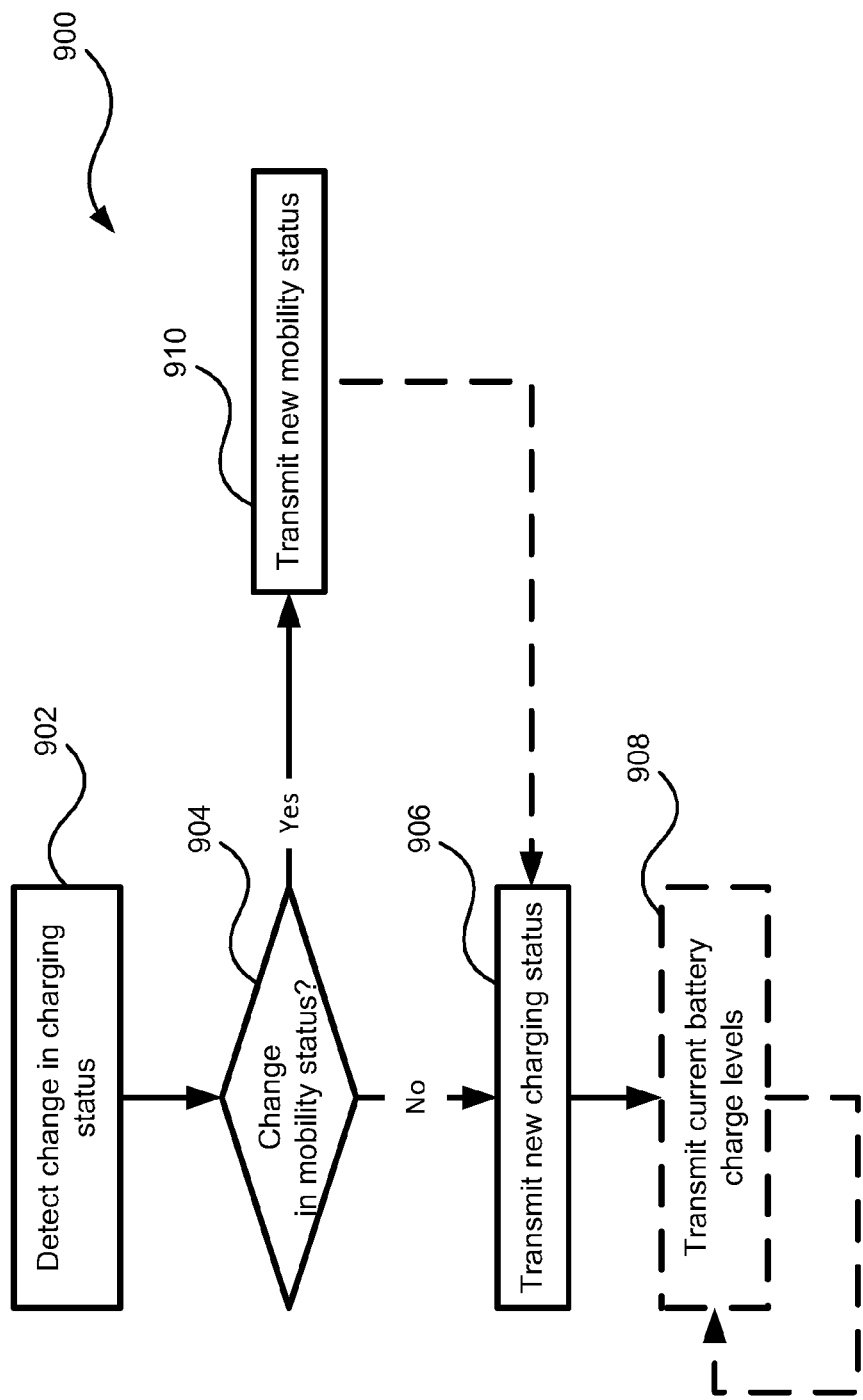
FIG. 9. Is a flowchart illustrating an example method for execution by a mobile device.

FIG. 9 is a flowchart illustrating a further embodiment. Method 900 is performed by the UE, and begins at step 902 by detecting that there has been a change in the charging status. This charging status change may be indicative of the UE being connected to a charging source, or it may be indicative of the decoupling of the UE from a charging source. In step 904 a determination of whether there has been a change in the mobility status is performed. The determination of the change in mobility status can be done as described above, through the use of various location tracking services and devices. The location of the device can be determined using any number of external sources including a GPS receiver, other satellite based positioning system receivers (e.g. GLONASS receiver, a Galileo positioning system receiver, a BeiDou Navigation Satellite System receiver, and other such systems) of through the use of terrestrial positioning information. Terrestrial positioning information can include interacting with network elements such as a Location Based Service function in the network that may take advantage of cell triangulation, or through other services including positioning information derived from WiFi network locations. If the UE determines that there has been no change in the mobility status (e.g. the UE may have been connected to a car based charger and thus there is no change in the mobility status), the method proceeds to step 906 where the changed charging status is transmitted to the network. If there has been a change in the mobility status, the method can proceed to step 910 where the new mobility status is transmitted to the network. Following step 910, the process continues to step 906 where the charging status is reported to the network. Those skilled in the art will appreciate that where step 910 is performed, steps 910 and 906 may be combined into a single report. Following step 906, the UE may optionally report its current battery charge levels to the network. This may take the form of a general indication of a high level of charge vs. a low level of charge, a percentage of battery life remaining, or a report on the mAh of charge remaining in the battery. This report of the battery levels may continue in some implementations. The continuing reporting may occur at fixed intervals, when threshold charge levels are crossed, at the request of the network, or at other specified intervals. Those skilled in the art will appreciate that in wireless networks that do not support the UE participating in a mobility status determination, step 902 can be immediately followed by step 906.

In various examples, the present disclosure describes the determination and use of a no-mobility status for UEs. Examples described herein may enable a UE-based notification of a no-mobility status to the network. The UE may determine its no-mobility status based on physical limitations to movement (e.g., connection to a stationary power source) and/or information from its own sensors indicating little or no-mobility. The UE may be further able to notify the network when its no-mobility status is no longer valid. This may provide more timely and/or accurate information about a UE's mobility status than conventional approaches that typically do not consider a no-mobility status.

Examples described herein may provide a relatively straightforward way for a network to accurately and quickly determine which UEs are not mobile, which may enable more efficient and effective selection of UEs to serve as UURs, for example.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution described in the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The teachings of the present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method by a mobile node in a wireless network, the method comprising:
   receiving an indicator related to mobility of the mobile node;
   transmitting an indication of a no-mobility status of the mobile node to the wireless network, the no-mobility status being based on the indicator, the indication of the no-mobility status including indication of a charging status of the mobile node; and
   receiving a notification, transmitted from a scheduler of the wireless network, that the mobile node has been selected to function as a relay, the selection being made by the scheduler based on a combination of the no-mobility status and the charging status of the mobile node.

2. The method of claim 1, wherein the indicator is received from one of: a power interface of the mobile node, a location tracking subsystem of the mobile node, or an accelerometer of the mobile node.

3. The method of claim 2, wherein the location tracking subsystem includes at least one of a Global Positioning System (GPS) receiver, a GLONASS receiver, a Galileo positioning system received and a BeiDou Navigation Satellite System receiver.

4. The method of claim 1, wherein the indicator comprises an indication of a connection to an external power source.

5. The method of claim 4, wherein the indicator comprises an indication of movement of the mobile node.

6. The method of claim 3, wherein the mobile node is determined to have the no-mobility status when an indicator of a connection to a stationary external power source is received, and the indication of the charging status is set to indicate that the mobile node is currently charging.

7. The method of claim 1, further comprising:
   receiving an update of the received indicator;
   determining, in accordance with the received update, that the no-mobility status is no longer valid; and
   transmitting an indication of change in the mobile node's no-mobility status to a node in the wireless network.

8. The method of claim 7, wherein the update comprises an indicator that the mobile node is no longer connected to an external power source.

9. The method of claim 1, further comprising:
   receiving, after transmitting the indication of the mobile node's no-mobility status to the wireless network, instructions from the wireless network that the mobile node can reduce signaling sent to the wireless network.

10. A method by a network entity managing a plurality of mobile nodes in a wireless network, the method comprising:
    receiving, from at least one mobile node in the plurality, a no-mobility indication associated with the respective mobile node, the no-mobility indication including an indication of a charging status of the respective mobile node; and
    transmitting a list of nodes to a scheduler for selecting a mobile node to function as a relay, the list identifying one or more mobile nodes of the plurality, each node identified in the list being associated with a no-mobility indication and an indication of charging status that, in combination, indicate suitability of the node to function as the relay.

11. A mobile device comprising:
    a memory for storing instructions; and
    a processor configured to execute the stored instructions to cause the mobile device to:
    receive an indicator related to mobility of the mobile device;
    transmit a no-mobility indication over an air interface towards a network node of a wireless network, the no-mobility indication being based on the received indicator, the no-mobility indication including indication of a no-mobility status and a charging status of the mobile device; and
    receiving a notification, transmitted from a scheduler of the wireless network, that the no-mobility status of the mobile device has been selected to function as a relay, the selection being made by the scheduler based on a combination of the no-mobility status and the charging status of the mobile node.

12. The mobile device of claim 11, further comprising at least one of: a power interface, a location tracking subsystem, and an accelerometer, from which the one or more indicators are received.

13. The mobile device of claim 11, wherein the indicator comprises at least one of: an indicator of a connection to an external power source, or an indicator of movement of the mobile node.

14. The mobile device of claim 11 wherein the indicator is received from a second network node over the air interface.

15. The mobile device of claim 13, wherein the processor is further configured to execute instructions to determine the mobile device to have a no-mobility status when the received indicator indicates connection to a stationary external power source, and the indication of the charging status is set to indicate that the mobile device is currently charging.

16. The mobile device of claim 11, wherein the processor is further configured to execute instructions to cause the mobile device to:
  receive an update of the indicator;
  determine, in accordance with the update, that the no-mobility status is no longer valid; and
  transmit an indication of change in the mobile device's no-mobility status towards the network node.

17. The mobile device of claim 16, wherein the update comprises an indicator that the mobile node is no longer connected to an external power source.

18. The method of claim 1, further comprising:
after receiving the notification, increasing frequency of monitoring of the mobility status and the charging status of the mobile node.

19. The method of claim 10, further comprising:
receiving, from the scheduler, a notification of a selected mobile node from the list of nodes to function as a relay; and
transmitting, to the selected mobile node, a notification that the no-mobility status of the selected mobile node is being used to select the selected mobile node to function as the relay.

20. The method of claim 10, further comprising:
receiving, from at least one mobile node in the plurality, an update to the no-mobility indication associated with the respective mobile node; and
transmitting an update of the list of nodes to the scheduler, update of the list being made in accordance with the received update to the no-mobility indication.

* * * * *